No. 780,106. PATENTED JAN. 17, 1905.
S. E. JONES.
CORN PLANTER.
APPLICATION FILED NOV. 21, 1903.
3 SHEETS—SHEET 1.
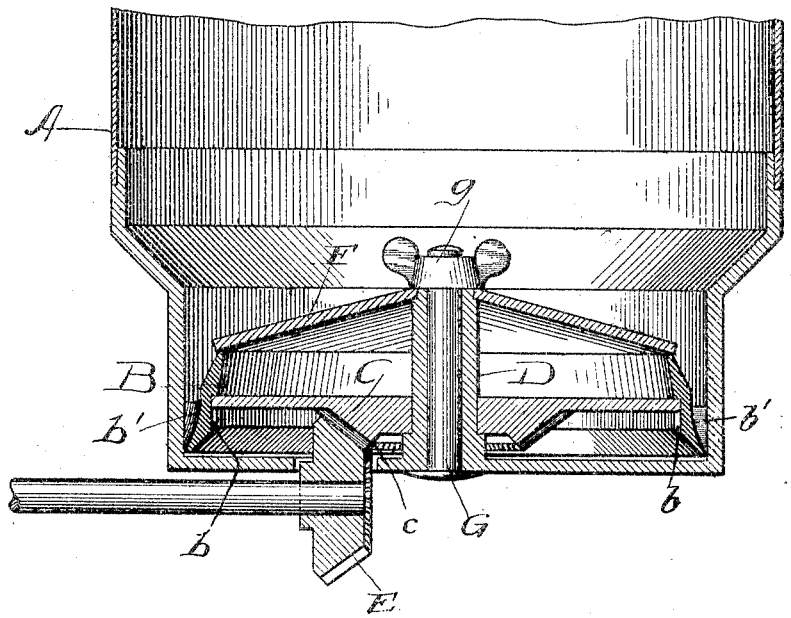
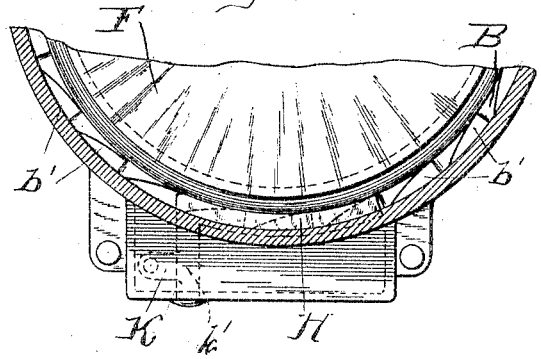
Witnesses
O. F. Plumtree
G. V. Domarus.
Inventor:
Samuel E. Jones
By Buckley & Durand
Attys.

No. 780,106. PATENTED JAN. 17, 1905.
S. E. JONES.
CORN PLANTER.
APPLICATION FILED NOV. 21, 1903.
3 SHEETS—SHEET 2.
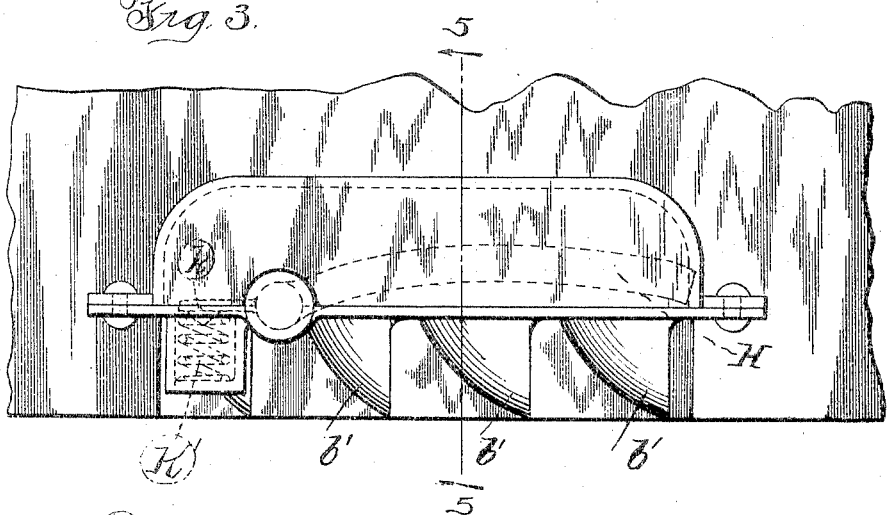
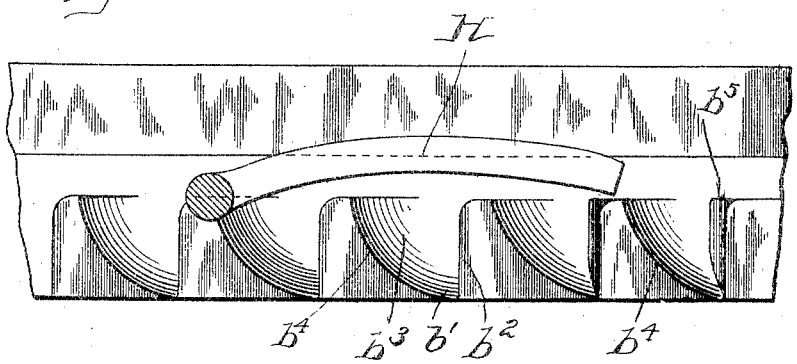
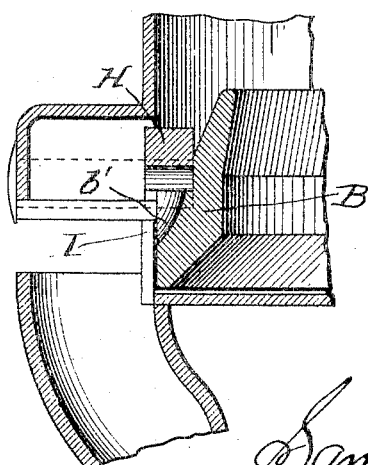

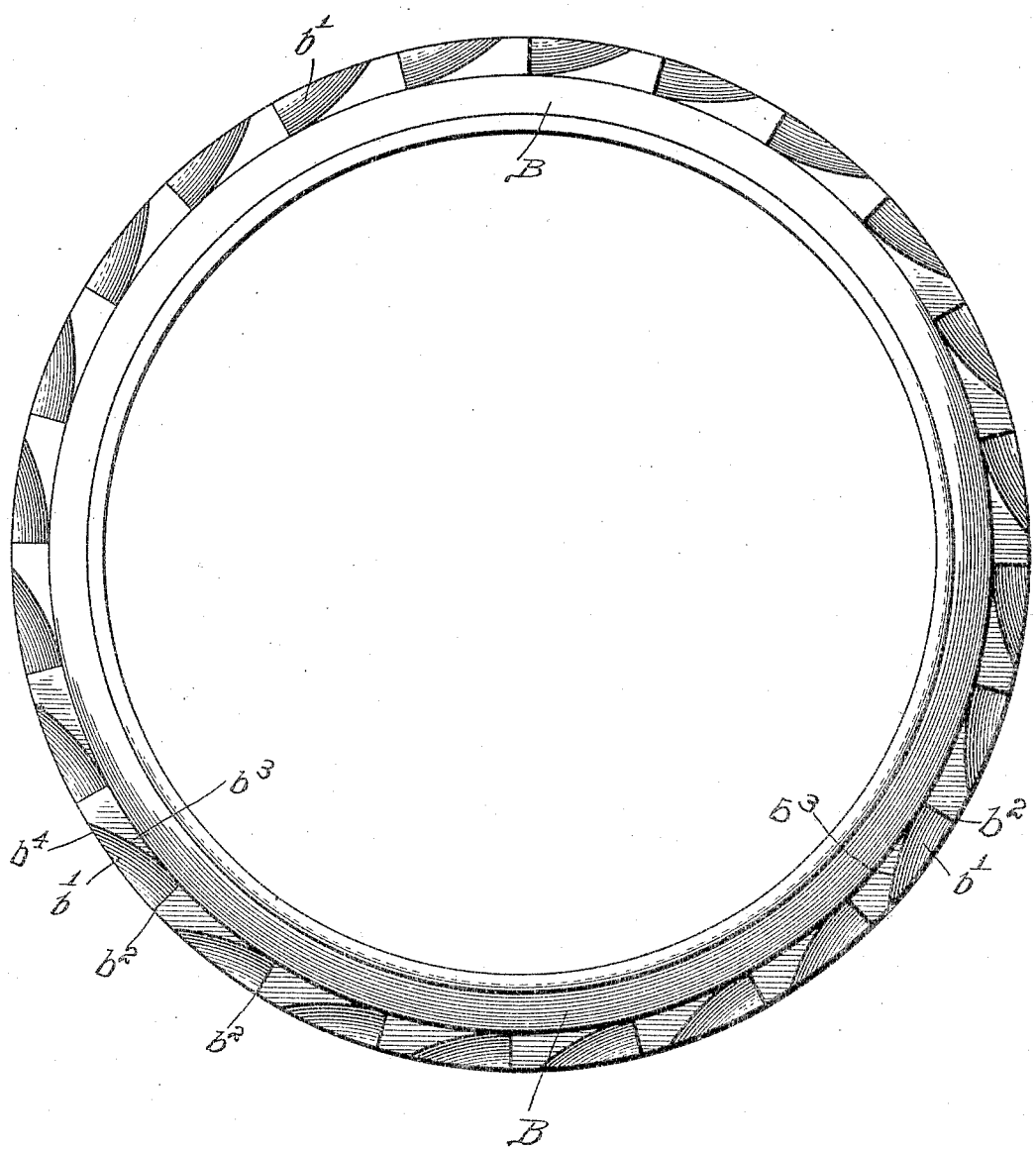

No. 780,106.

Patented January 17, 1905.

UNITED STATES PATENT OFFICE.

SAMUEL E. JONES, OF ROCK ISLAND, ILLINOIS, ASSIGNOR TO ROCK ISLAND PLOW COMPANY, OF ROCK ISLAND, ILLINOIS, A CORPORATION.

CORN-PLANTER.

SPECIFICATION forming part of Letters Patent No. 780,106, dated January 17, 1905.

Application filed November 21, 1903. Serial No. 182,066.

*To all whom it may concern:*

Be it known that I, SAMUEL E. JONES, a citizen of the United States of America, and a resident of Rock Island, Rock Island county, Illinois, have invented a certain new and useful Improvement in Corn-Planters, of which the following is a specification.

My invention contemplates an improved seed-dropping mechanism adapted more particularly for use in corn-planters and of that character in which a single kernel of corn can be dropped each time the mechanism is actuated, the object being in the present case to provide a dropping mechanism of such character that each cell of the rotary seed-plate can only receive and hold but one kernel of corn regardless, within limits, of course, of the size and shape of the kernels.

Prior to my invention various constructions have been proposed for enabling the cells of the rotary seed-plate to receive and hold but a single kernel of corn; but, so far as I am aware, all of such attempts have been open to objection in this respect, that the various shapes and sizes of kernels of corn would at times make trouble—that is to say, with certain sizes of corn the cells would receive and hold but a single kernel, but with other sizes two or more kernels would enter each cell—and, again, in case the kernels are apt to be of quite different shapes then in such case the cells would be liable to receive one or more kernels or in some cases fail to receive even a single kernel. With my improved construction, however, and with my improved form of cell for the rotary seed-plate the foregoing difficulty is, I find, entirely obviated, each cell, owing to its peculiar formation, being adapted to receive and hold but a single kernel of corn regardless of the shape of the kernels and, within limits, regardless of the size of the kernels. In this way it is obvious that my invention is calculated to insure a more certain and satisfactory operation of the dropping operation and is also of a character to render it unnecessary to employ for certain kinds of work more than one rotary seed-plate, or at least to render it unnecessary to employ for all kinds of work a comparatively large number of seed-plates having different-sized cells, which has heretofore been the practice.

The nature and advantages of my invention will, however, hereinafter more fully appear.

In the accompanying drawings, Figure 1 is a vertical section through the bottom of a seed-hopper and through the corn-dropping mechanism which is provided at the bottom of this hopper and which mechanism embodies the principle of my invention. Fig. 2 is a partial plan view of the rotary seed-plate and adjuncts shown in Fig. 1, showing the casing of the hopper in section. Fig. 3 is an enlarged side elevation of the discharge side of the dropping mechanism. Fig. 4 is a similar view of a portion of the rotary seed-plate, showing the location of the pivoted guard or cut-off which prevents the escape of more than one kernel at a time. Fig. 5 is a vertical section on line 5 5 in Fig. 3. Fig. 6 is a plan view of the rotary seed-ring.

Referring to Fig. 1, the general construction of the hopper A can be of any suitable known or approved character. The bottom of this hopper is, however, adapted to inclose and bear against the circumference or periphery of the rotary seed-plate, which plate is preferably composed of the annular ring B and the inner disk or plate C. The plate and ring can be secured to rotate in unison—as, for example, by providing the ring with notches $b$, adapted to receive projections on the edge of the plate. Said plate is mounted to rotate upon the vertically-arranged hub or boss D and, as illustrated, is provided with a bevel-gear portion $c$, adapted to engage the bevel-gear E. A stationary cover-plate F is provided and held in place by a bolt G and a thumb-nut $g$, applied as shown in Fig. 1. Thus a rotation of the bevel-gear E through the medium of any suitable means produces a rotation of the rotary seed-plate, composed of the ring B and the plate C. It is this ring B and the peculiar formation of the seed-cells $b'$ in this ring which constitutes the principal feature of my invention. It will be observed that these cells are in the nature of notches, formed at regular intervals in the circumference or periphery of the ring B, each notch providing, in conjunction with the opposing inner surfaces of the hopper-casing, a cell adapted to receive and hold a kernel of corn. When the ring B is in place, as shown in the drawings, each cell thus provided by one of the notches is practically three-sided, as it has a rear, straight, and vertical wall $b^2$, an inner curved wall $b^3$, and an outer wall provided by the inner surface of the upper casing. Thus each seed-cell tapers downwardly and forwardly, the taper in each direction preferably being of a character to give the cell a substantially pointed or sharp forward end and a pointed or reduced bottom. In other words, each cell may be said to have a wedge-shaped forward end and bottom, so that the forward limits of each cell extend in a curved line $b^4$ from the front and top of the cell to the bottom and rear thereof. Preferably the upper end of each rear wall $b^2$ is rounded at its upper end, as shown in the drawings. With the cells thus formed I find that a variation in the shapes of the kernels makes very little difference as far as the reception by each cell of a single kernel is concerned, each cell receiving and carrying around but a single kernel, even though the kernels may vary considerably with respect to shape and form. Also I find that seed-cells of this character will receive and hold but a single kernel, even though the kernels may vary considerably with respect to size. In fact, with my improved form of seed-cell I find that anywhere from one to four plates having cells of different sizes is sufficient to insure the desired single-kernel dropping action with all possible sizes of corn.

The pivoted guard H (shown in Figs. 2 to 5, inclusive) is preferably arranged to rest upon the ledge of the ring in which the cells are formed, as shown in the drawings, and is arranged above and opposite the opening I in the hopper, through which the kernels are discharged from the cells into the discharge-spout J. A spring K, applied to an arm $k$ on the shaft $k'$ on which the swinging or pivoted guard is mounted, is employed for keeping the said guard yieldingly pressed down upon the ledge of the rotary ring B. With this arrangement the guard prevents the corn from being carried around on this ledge to a point on this ledge where it could fall through the discharge-opening and limits the discharge of corn to only the kernels which have been received in the cells provided by the notches in the ring. The guard H is preferably curved, as shown, so that its end is capable of partially entering each cell as the ring rotates, and in this way all kernels except the one which has first entered the cell are pushed back and prevented from being carried any farther. In this connection it will be seen that the rounded upper ends $b^5$ of the rear walls of the cells enable the free end of the guard to rise readily without obstructing or hindering the rotation of the ring.

It will be readily understood that the dropping mechanism thus constructed can be employed in any suitable known or approved corn-planter or any other planting device and that any suitable means can be employed for rotating the said plate, composed of the ring B and the plate C, and for thereby causing the kernels of corn to be discharged from the hopper in the well-known or desired manner.

The recesses $b'$, which do not extend downwardly entirely through the rotary ring—that is to say, which are open at their tops and closed at their bottoms by the metal of the ring in which they are formed—are each preferably provided with a straight rear wall $b^2$, as explained, whereby the kernels of corn or other grain will have no tendency whatever to become wedged or crowded between the rotary ring and the stationary vertical walls of the hopper.

What I claim as my invention is—

1. A seed-dropping mechanism comprising a rotary member having comparatively shallow recesses formed in its periphery, and a hopper having its bottom portion adapted to inclose said rotary member, each recess being adapted to communicate at its upper end with the interior of said hopper and each recess having a vertical rear wall, but said recesses all being of such depth as to terminate short of, or at points more or less above, the lower edge or bottom surface of the rotary member in which they are formed, whereby each recess is open at its top but closed at its bottom.

2. A seed-dropping mechanism comprising a rotary annular member mounted to rotate about a vertical axis, said member having its periphery provided with recesses, and a hopper having its bottom portion adapted to inclose said dropping mechanism, the seed-cells provided by the said recesses tapering downwardly and each recess having a vertical rear wall, but said recesses all being of such depth as to terminate short of, or at points more or less above, the lower edge or bottom surface of the rotary member in which they are formed, whereby each recess is open at its top but closed at its bottom.

3. A seed-dropping mechanism comprising a rotary annular member adapted to rotate about a vertical axis, said member having its periphery provided with recesses, and a hopper having its lower portion adapted to inclose said dropping mechanism, the seed-cells provided by said recesses tapering forwardly and communicating at their upper ends with the interior of said hopper and each recess having a vertical rear wall, but said recesses all being of such depth as to terminate short of, or at points more or less above, the lower edge or bottom surface of the rotary member in which they are formed, whereby each recess is open at its top but closed at its bottom.

4. A seed-dropping mechanism comprising a rotary removable ring, said ring having its periphery provided with recesses, and a hopper having its lower portion adapted to inclose said dropping mechanism, the seed-cells provided by said recesses tapering both downward and forward and communicating at their upper ends with the interior of said hopper and each recess having a vertical rear wall, but said recesses all being of such depth as to terminate short of, or at points more or less above, the lower edge or bottom surface of the rotary member in which they are formed, whereby each recess is open at its top but closed at its bottom.

5. A seed-dropping mechanism comprising a rotary annular member having its periphery provided with recesses, and an inclosure surrounding said member, the said cells provided by said recesses having vertical rear walls and forwardly and downwardly converging side walls, but said recesses all being of such depth as to terminate short of, or at points more or less above, the lower edge or bottom surface of the rotary member in which they are formed, whereby each recess is open at its top but closed at its bottom.

6. A seed-dropping mechanism comprising a rotary removable ring, said ring having its periphery provided with recesses wider at their tops than at their bottoms and wider at their rear ends than at their forward ends, but said recesses all being of such depth as to terminate short of, or at points more or less above, the lower edge or bottom surface of the rotary member in which they are formed, whereby each recess is open at its top but closed at its bottom.

7. A seed-dropping mechanism comprising a rotary annular member having the upper edge of its periphery provided with recesses, each recess being wider at its rear end than at its forward end.

8. The improved seed-dropping mechanism comprising a rotary annular member, provided with notches, substantially of the character shown and described.

Signed by me at Rock Island, Rock Island county, Illinois, this 16th day of October, 1903.

SAMUEL E. JONES.

Witnesses:
   H. B. ROSENBERY,
   WM. ONION.